United States Patent [19]

Reiher

[11] 3,907,487

[45] Sept. 23, 1975

[54] CANDLEWICK PREPARATION AND INSTALLATION APPARATUS

[76] Inventor: Wilfred L. Reiher, 4701 N. 55th St., Phoenix, Ariz. 85018

[22] Filed: May 23, 1974

[21] Appl. No.: 472,851

[52] U.S. Cl. ............... 425/517; 425/106; 425/510; 425/289; 425/317; 425/803; 29/200 R; 29/241
[51] Int. Cl.² .......................................... B29C 27/30
[58] Field of Search.. 29/200 B, 241, 200 R, 208 D; 425/112, 106, 289, 317, 324 R, 803, DIG. 201, 517

[56] References Cited
UNITED STATES PATENTS

| | | | |
|---|---|---|---|
| 515,034 | 2/1894 | Weissenborn | 425/803 X |
| 3,541,973 | 11/1970 | Aquarius | 425/112 X |
| 3,619,888 | 11/1971 | Sawada et al. | 29/200 R X |
| 3,703,760 | 11/1972 | Pommer | 29/241 X |

*Primary Examiner*—Robert L. Spicer, Jr.
*Attorney, Agent, or Firm*—Herbert E. Haynes, Jr.

[57] ABSTRACT

An apparatus for prewaxing, cooling and otherwise conditioning a continuous strand of candlewicking material and directing the conditioned wicking through a mechanism which centrally inserts a measured length of the conditioned wicking into a preformed candle body and cuts the inserted length of wicking.

15 Claims, 8 Drawing Figures

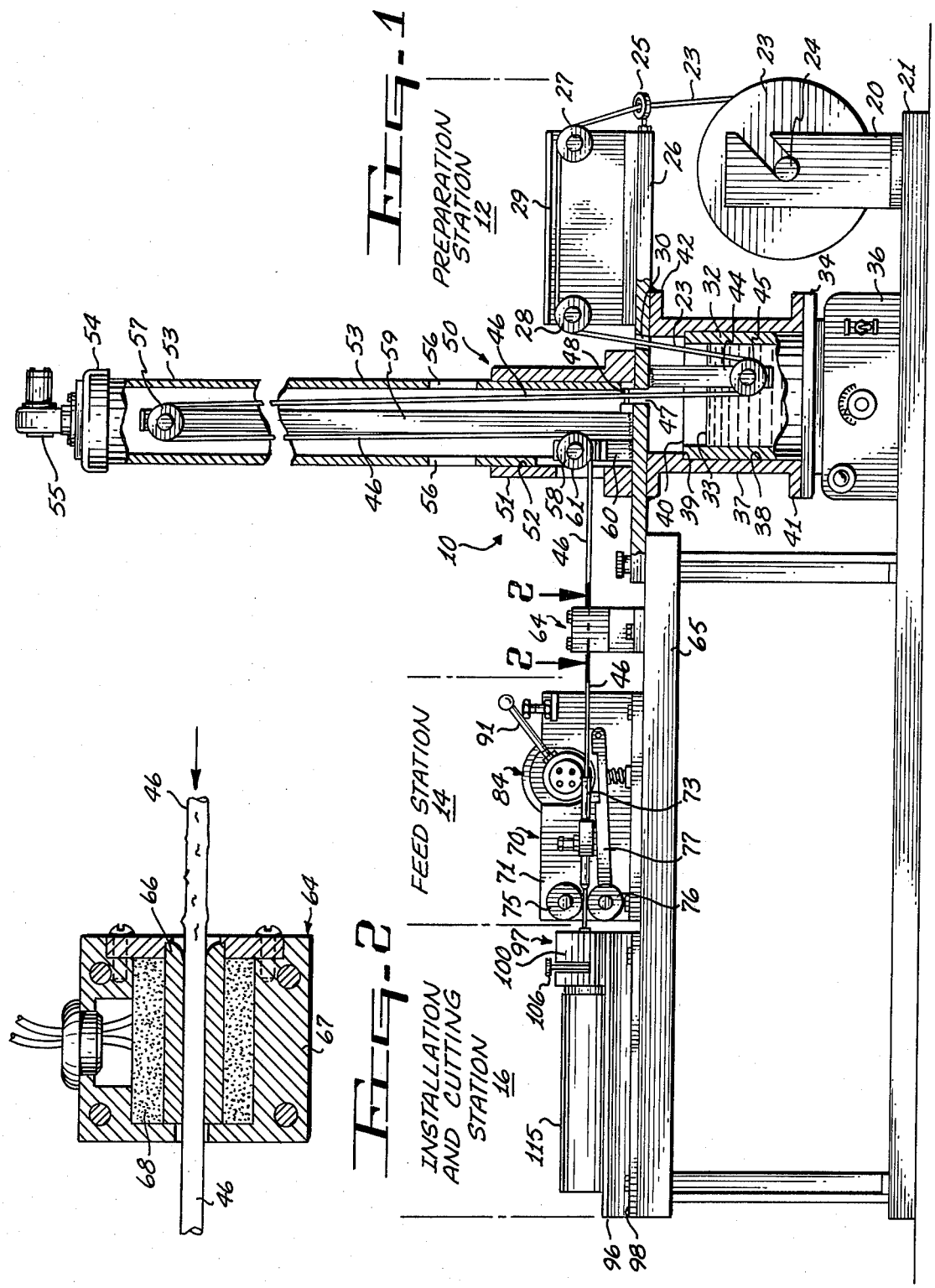

CANDLEWICK PREPARATION AND INSTALLATION APPARATUS

BACKGROUND OF THE INVENTION

1. Field of the Invention

This invention relates to the art of candle making and more particularly to an apparatus for preparing and inserting wicks in candles.

2. Description of the Prior Art

In general, candles are most often manufactured in two well known basic manners which are sometimes referred to in the industry as the dipping method and the molding method.

The dipping method is usually restricted to the manufacturing of relatively thin candles such as the so called "dinner tapers" and "birthday candles". Briefly, the dipping method includes the prewaxing of the candlewicking material which is then cut into the desired lengths and attached to a suitable molten wax dipping machine. This machine alternately dips and cools the wicks so that successive layers of solidified wax are formed. The dipping and cooling are repeated a number of times until the desired candle thickness is achieved.

The molding method is normally accomplished for forming relatively thick candles which if formed by the dipping method would require excessive amounts of time. A commonly employed molding method comprises the steps of casting wax in a mold having a coaxially centered wick rod or pin extending through the entire length of the mold. Molten wax is poured into the mold which is then cooled by suitable well known means, such as by water cooling, to cause solidification of the wax. The solidified wax body is then removed from the mold and a prewaxed wick is inserted through the axial bore formed by the wick rod or pin. The conventional wicking used in this type of cast candle is a metal core wick, usually lead, with an outer covering of suitable wicking material such as woven cotton. The wick is prewaxed such as by impregnation with a crystalline paraffin wax. The metal core, or other suitable stiffening material, will melt or burn off as the candle burns down.

Candlewicking material is purchased by the candlemaker on reels and must be prewaxed prior to usage. This is usually accomplished by passing the wicking through a molten wax bath, cooling the wicking and then rewinding it onto another reel until ready for use. Inserting of the prewaxed wicking into a preformed candle body, such as of the type described above having the axial bore therein, is accomplished by cutting the wicking into the desired lengths and inserting a cut length of wick into each of the candle bodies.

The above described method of preparing, cutting and inserting wicks into preformed candle bodies is time consuming and costly due to the three basic tasks which must be accomplished. Some machinery has been developed in an attempt to reduce the time and cost factors, however, to the best of my knowledge, each of the three basic tasks are still accomplished separately. Thus, the machinery and pepole needed to accomplish these tasks and the accompanying repetitious handling has held both the time consumption and cost rates at relatively high levels.

Thus, the need exists for a new and improved apparatus for preparing and installing candlewicks which overcomes some of the problems of the prior art.

SUMMARY OF THE INVENTION

In accordance with the present invention, a new and improved apparatus for preparing and installing wicks in preformed candle bodies is disclosed as comprising a prewaxing station, drive and metering station, and an installation and cutting station.

The drive and metering station includes mechanisms which move a continuous strand of wicking material through the various stations of the apparatus. Each actuation of the mechanisms in the drive and metering station produces one increment of strand movement within each of the stations. Thus, as one measured length of wicking is entering the prewaxing station, another is emerging therefrom, another is passing through the drive and metering station and still another is being inserted in the axial bore of a preformed candle body located in the installation and cutting station. Upon completion of each movement of the strand, a cutting devide is actuated which severs that length of wicking which was inserted into the candle body from the strand remaining in the apparatus. The completed candle is then removed from the installation and cutting station and replaced with another candle body and the sequence is repeated.

It may now be seen that the apparatus of the present invention simultaneously prewaxes, measures, installs and cuts candlewicks with complete elimination of repetitious handling and substantially improves the time consumption and cost factors associated with this type of operation.

Accordingly, it is an object of the present invention to provide a new and useful apparatus for preparing and installing wicking in candles.

Another object of the present invention is to provide a new and useful apparatus for preparing and installing wicking in candles which simultaneously measures, installs, and cuts candlewicking.

Another object of the present invention is to provide a new and useful apparatus for simultaneously prewaxing, measuring, installing and cutting candlewicking.

The foregoing and other objects of the present invention as well as the invention itself may be more fully understood from the following description when read in conjunction with the accompanying drawings.

BRIEF DESCRIPTION OF THE DRAWINGS

FIG. 1 is a side or elevational view of the apparatus of the present invention partially broken away to show the various features thereof.

FIG. 2 is an enlarged sectional view taken on the line 2—2 of FIG. 1.

DESCRIPTION OF THE PREFERRED EMBODIMENT

Figure 3:
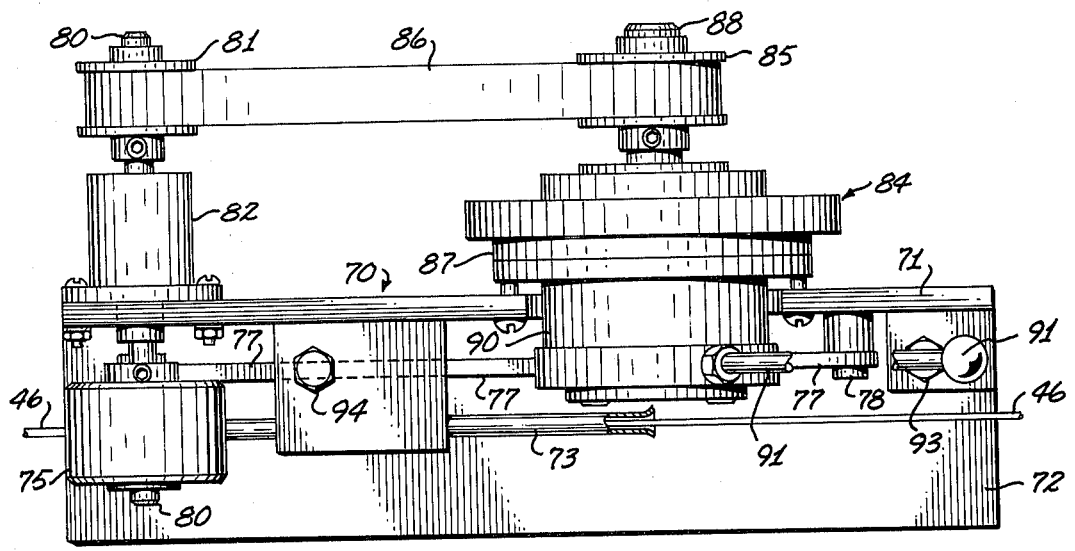
FIG. 3 is an enlarged top or plan view of the drive and metering station of the apparatus of the present invention.

Referring more particularly to the drawings, FIG. 1 illustrates the apparatus of the present invention which is indicated generally by the reference numeral 10. For descriptive purposes and for a clearer understanding of the apparatus 10, FIG. 1 shows the apparatus as being divided into three stations which correspond to the three basic functions accomplished by the apparatus.

The first station 12 may be referred to as the preparation area or prewaxing station. In this station, untreated candlewicking is prewaxed, cooled and provided with a smooth uniform peripheral surface as will hereinafter be described in detail.

The second station 14 may be referred to as the drive and metering area, or simply as the feed station. In this area, mechanisms are provided which move the candlewicking through the apparatus 10 in predetermined measured increments as will hereinafter be described in detail.

The third station 16 may be referred to as the installation and cutting area. In this station, the candlewicking is inserted into a preformed candle body and cut at the proper location as will hereinafter be described in detail.

In the prewaxing station 12, a suitable cradle 20 is mounted on a base 21, and the cradle 20 is adapted to demountably support a reel or spool 22 or untreated wicking 23 in the form of an elongated strand. The reel 22 is carried on an axle 24 so that the reel is rotatably journaled in the cradle 20.

Candlewicking is usually supplied by the manufacturer in the untreated form, that is, the wicking is not impregnated with wax, and the untreated wicking is wound on reels. Therefore, a reel of wicking as received from the manufacturer can be directly mounted in the cradle 20 of the apparatus 10 without special handling.

As is well known, when a strand of any type is unwound from a reel or spool, the pay out point, that is, the point where the strand leaves the spool, will constantly move back and forth along the length of the spool. Thus, the apparatus 10 is provided with an alignment loop 25, or other suitable means for directing the strand of untreated wicking material into a specific path. The loop 25 is mounted on a plate 26 mounted above the base 21 and is free to swivel so that the strand of untreated wicking 23 is directed upwardly from the reel 22 through the loop 25 and into a path which aligns with a pair of pulleys 27 and 28. The pulleys 27 and 28 are rotatably supported on an upstanding member 29 mounted atop the plate 26 and are employed as means for guiding movements of the strand of untreated wicking 23.

After passing over the second pulley 28, the untreated wicking strand 23 is directed angularly downwardly through an aperture 30 formed in the plate 26 and enters into a pot 32 of molten wax 33. The wax pot 32 is affixed to the heating plate 34 of a suitable heater 36.

A tubular housing 37 coaxially circumscribes the wax pot 32 to serve as means for retarding heat dissipation and to prevent ambient air from causing temperature fluctuations or surface congelation. The housing 37 is provided with a bore 38 in which the wax pot 38 is nestingly positioned, and the bore 38 is formed with a shoulder 39 which restingly engages the upper annular edge 40 of the wax pot 32 so that the housing 37 is supportingly positioned thereby. The housing may be provided with a lower annular flange 41 which may rest upon or be in close proximity to the heating plate 34 of the heater 36. A similar flange 42 is provided at the upper end of the housing 37 for fixedly attaching the housing to the lower of the plate 26. Thus, the housing 37 also serves as means for supporting the plate 26.

A depending bracket 44 is fixedly attached to the lower surface of the plate 26 and extends therefrom into the molten wax 33. A pulley 45 is rotatably mounted on the lower end of the bracket 44 over which the wicking strand passes. Thus, the untreated wicking strand 23 enters the molten wax 33, passes over the pulley 45 and emerges upwardly from the wax pot 32 as treated wicking 46.

The treated wicking strand 46, which has been impregnated with molten wax, passes upwardly a second aperture 47 formed in the plate 26 and passes through a wiping grommet or ring 48. The ring 48 will wipe excess molten wax from the wicking strand 46 and the excess wax will fall back into the wax pot 32.

After emerging from the wiping ring 48, the treated wicking strand 46 is directed upwardly into a cooling tower 50 wherein the strand is cooled by air currents to solidify the impregnating wax. The cooling tower 50 includes a mounting base 51 fixed atop the plate 26 and in which a bore 52 is formed for receiving the lower end of an elongated tubular tower housing 53. A suitable cap 54 is mounted on the upper end of the tower housing 53 for supporting a blower 55. The blower 55, which may be in the form of a well known centrifugal blower mechanism, directs air downwardly through the tower housing to cool the treated wicking strand 46. The air exits the housing 53 through slots 56 formed therein. The treated wicking strand 46 extends upwardly within the cooling tower 50 and passes over a top pulley 57 which changes the direction of the strand 46 so that it extends downwardly from the top pulley 57 and passes over a lower pulley 58. The pulleys 57 and 58 are rotatably mounted on suitable upstanding standards 59 and 60, respectively. The standards 59 and 60 are affixed atop the plate 26 within the mounting base 51. The treated wicking strand 46 is directed through the cooling tower 50 as previously described and emerges therefrom, through a slot 61 formed in the mounting base 51, in a horizontally disposed path.

It should be noted that access to the wax pot 32 and to the various pulleys 45, 57, and 58, for servicing and the like, is easily accomplished due to the previously described construction details. Access to the pulleys 57 and 58 is gained by simply lifting the tower housing 53 out of the bore 52 of the mounting base 51. The pulleys 57 and 58 will remain in their respective positions due to their respective standards 59 and 60 being fixedly mounted on the plate 26. Lifting of the plate 26 will lift the housing 37 from around the wax pot 32 so that the molten wax 33 may be replenished or the pot can be otherwise serviced. This same lifting of the plate 26 will move the pulley 45 out of the molten wax 33 so that the pulley can be reached for threading of the wicking strand therearound or for other servicing as may be required.

The final step of preparing the wicking strand 46 within the prewaxing station 12 is accomplished by passing the strand through a peripheral smoothing or deburring device 64. The deburring device 64 is suitably mounted on a table 65 so as to be in alignment with the horizontal path of the treated wicking strand 46 as it emerges from the cooling tower 50. As seen in FIG. 2, the deburring device includes a smoothing or forming die 66, mounted in a suitable housing 67, through which the strand 46 passes. A heating element 68 coaxially circumscribes the forming die 66 and heats that die to a temperature below the melting point of the particular wax which is being employed to impregnate the wicking strand. This softens the surface of the strand, thus, burrs or other irregularities existing on the periphery of the treated strand 46 will be eliminated and a smooth strand of consistant diameter will emerge from the deburring device 64.

The treated wicking strand 46 having been prepared as previously described in the prewaxing station 12 is directed therefrom into the feed station 14. The feed station 14 comprises a mechanism 70 which drives and measures the wicking strand 46, and as shown in FIG. 1, is mounted on the table 65 so as to be in alignment with the deburring device 64 for receiving the treated wicking strand 46 therefrom.

Figure 4:
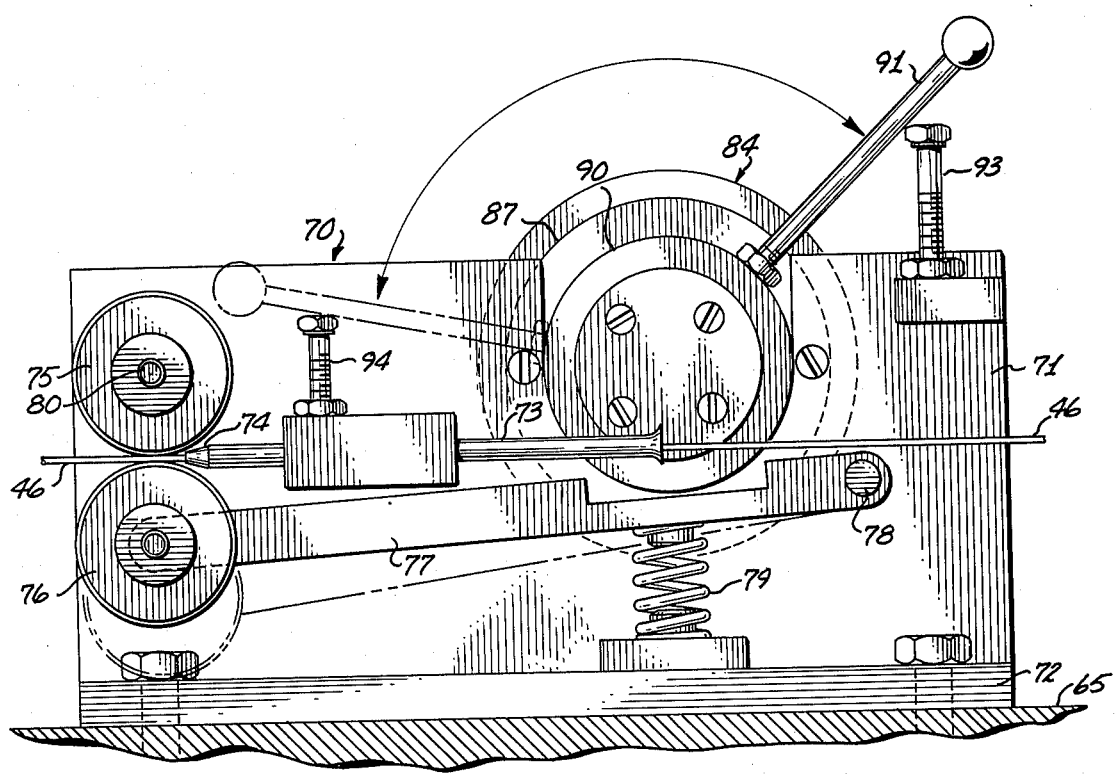
FIG. 4 is a side view of that portion of the apparatus shown in FIG. 3.

As best seen in FIGS. 3 and 4, the drive and measuring mechanism 70 includes an upstanding plate 71 having a mounting flange 72 for attachment to the table 65. A guide tube 73 is suitably mounted on the upstanding plate 71 and is adpated to have the wicking strand 46 pass therethrough. The wicking strand 46 emerges from the outlet end 74 of the guide tube 73 and is directed tangent to the periphery of a drive roller 75 and thus passes between the drive roller 75 and an oppositely positioned pinch or idler roller 76. The idler roller 76 is rotatably journaled on the extending or free end of a lever 77 which is pivotably attached at its other end to the plate 71 by a suitable pivot pin 78. The lever 77 is pivotably movable between the dash line position and the solid line position shown in FIG. 4 and is biased into the solid line position by a spring 79. The spring 79 is suitably coupled at its upper end to the lever 77 and at its lower end to the mounting flange 72 of the upstanding plate 71. The driver roller 75 is fixed on one end of a shaft 80 which has a pulley 81 fixed on its opposite end. The shaft 80 extends through the upstanding plate 71 and is journaled for rotation in a suitable bearing housing 82 fixed on the plate. A drive unit 84 having a pulley 85, as will hereinafter be described, is employed to drive the drive roller 75 by means of an endless belt 86 which passes over the pulleys 85 and 81.

The drive unit 84 may be any suitable well known device such as a ratchet wheel, a one way clutch, or other suitable device which produces a rotational output in one direction only in response to a rotational input in one direction only. That is, a rotational input in a given direction will produce a rotational output, and a rotational input in the opposite direction will produce no output.

The drive unit 84 has a housing 87 which is mounted on the upstanding plate 71 and contains suitable mechanism (not shown) for producing the above described one way motion. The one way output motion is applied via an output shaft 88 to the pulley 85 which is fixed for rotation therewith. An input shaft 90 extends from the housing 87 through the upstanding plate 71 and is provided with a radially extending handle 91 suitably affixed thereto.

A pair of adjustable stops 93 and 94 are mounted on the upstanding plate 71 and are positioned to engage the handle 91 of the drive unit 84 at opposite ends of its arcuate movement. The stops 93 and 94 therefore serve to limit the arcuate path of the handle 91 and thus limit the rotational input to the drive unit and the rotational output thereof.

Rotation of the handle 91 of the drive unit 84, from the solid line position shown in FIG. 4 to the dashed line position, produces a given amount of rotational movement of the drive roller 75 through the previously described mechanisms. Thus, rotation of the drive roller 75 produces a specific amount of linear movement of the wicking strand 46.

It may now be seen that the drive and measuring mechanism 70 will move the wicking strand in intermittent measured increments through the prewaxing station 12, the feed station 14 and into the installation and cutting station 16 as will hereinafter be described in detail.

As best seen in FIGS. 5 through 8, the installation and cutting station 16 includes an upwardly opening V-shaped trough 96 upon one end of which a cutting device 97 is mounted and with the other end, or remainder thereof, serving as an installation area. The trough 96 is provided with a suitable base 98 for mounting the trough on the table 65.

The cutting device 97 includes a housing 100 having a horizontally disposed aperture 101 formed therethrough. The aperture 101 is adapted to receive an input bushing 102 and an outlet bushing 103 through which the wicking strand 46 passes after having emerged from the feed station 14. An upwardly opening vertical slot 104 is formed in the housing 100 adjacent a surface 105 thereof with that surface being the one from which the wicking strand 46 emerges after having passed through the housing. The slot 104 is transverse with respect to the longitudinal axis of the aperture 101 and extends downwardly from the top of the housing 100 to a point below the aperture. A lever 106 is pivotably mounted within the slot 104 by a pivot pin 107 which is laterally offset with respect to the aperture 101 of the housing 100. The lever 106 is pivotably movable between the solid line position and the dash line position shown in FIG. 8 so that a cutting edge 108 formed on the lever will move in an arcuate path which tranversely intersects the longitudinal axis of the aperture 101. The lever 106 is provided with a tail end 109 and an actuating end 110 with these ends oppositely extending from the slot 104 so as to be transverse with the longitudinal axis of the aperture 101. The tail end 109 of the lever 106 is provided with an aperture 111 therein to which one end of a tension spring 112 is connected. The other end of the spring 112 is suitably coupled to the base 98 of the trough 96 so that the lever 106 is biased to the solid line position shown in FIG. 8. The actuating end 110 of the lever 106 may be provided with a finger pad 113 or other suitable means by which the lever can be manually moved from its normal non-intersecting position (solid line) to its actuated intersecting position (dash line).

Figure 5:
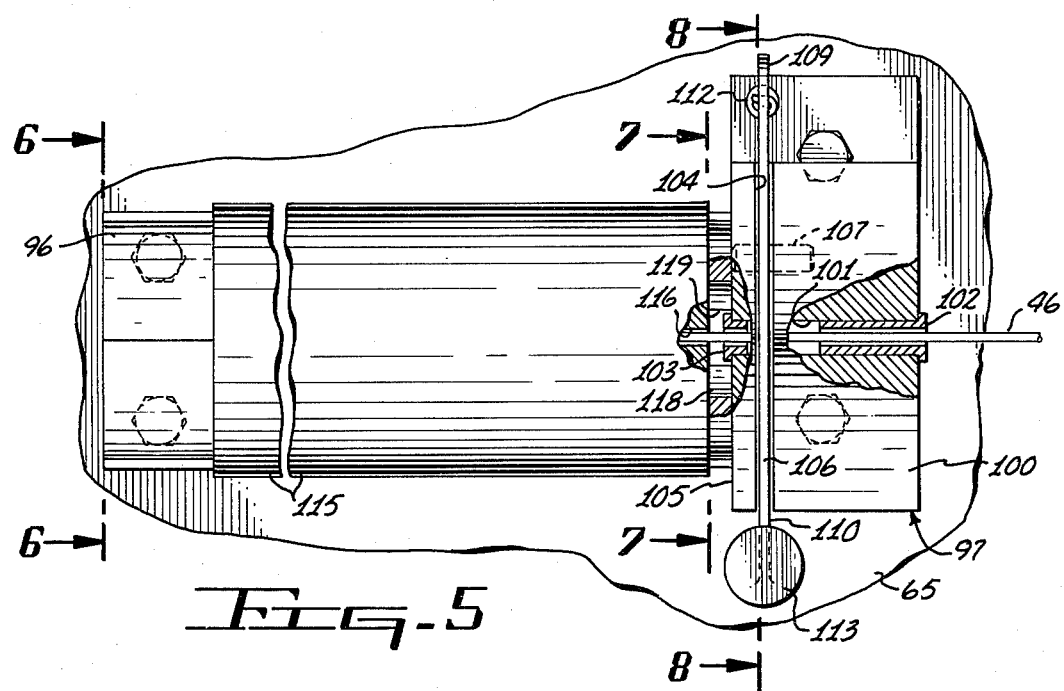
FIG. 5 is a plan view of the installation and cutting station of the apparatus of the present invention.
Figures 6, 7:
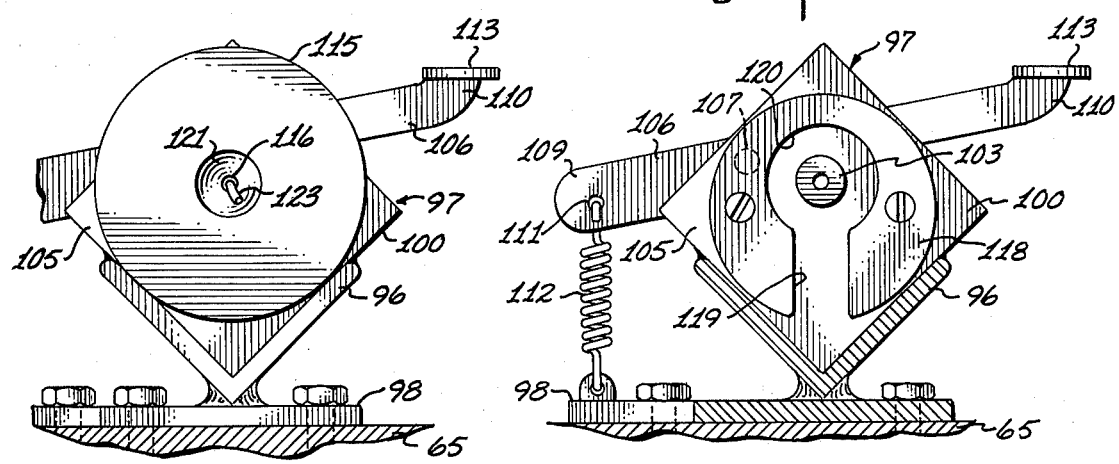
FIG. 6 is a fragmentary sectional view taken on the line 6—6 of FIG. 5.
FIG. 7 is a sectional view taken on the line 7—7 of FIG. 5.
Figure 8:
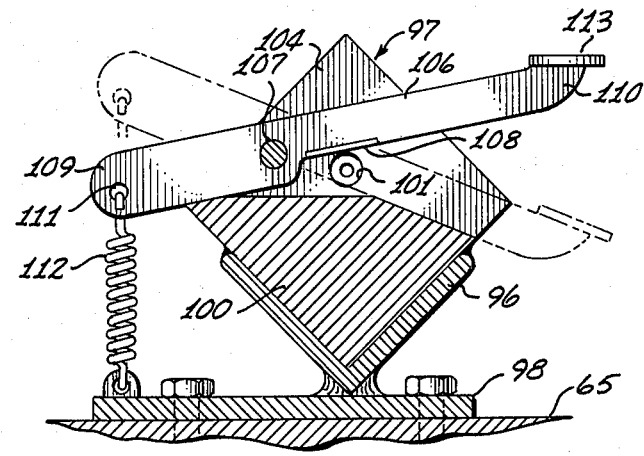
FIG. 8 is a sectional view taken on the line 8—8 of FIG. 5.

A preformed candle body 115 having an axial bore 116 formed therethrough, a best seen in FIGS. 5 and 6, is positioned within the trough 96. The trough 96 is designed to accept a candle body having a specific diameter so that the axial bore 116 will be in axial alignment with the inlet and outlet bushings 102 and 103, respectively of the cutting device 97.

It should be obvious that the trough 96 can be adapted to properly position candle bodies having smaller diameters such as with suitable spacers (not shown), or the trough 96 could be replaced with a step down trough (not shown) to accept larger diameter candle bodies.

In any event, when the candle body 115 is placed in the trough 96, one end of the body is placed in abutting contact with a butt plate 118 suitably mounted on the surface 105 of the cutter housing 100. The butt plate 118 is formed with a keyhole shaped passage 119 therethrough which is open at the bottom edge of the plate 118 and extends upwardly to position the circular opening 120 of the passage 119 coaxially with respect to the outlet bushing 103. The butt plane 118 is employed to prevent a residual wax build up from occurring around or within the outlet bushing 103 which if not prevented could interfere with movement of the wicking strand 46 through the cutting device 97.

It may now be seen that to operate the apparatus 10 of the present invention, an operator simply places a candle body 115 within the trough 96 of the installation and cutting station 16, actuates the drive and measuring mechanism 70 of the feed station 14 to move a predetermined length of wicking strand 46 through the cutting device 97 into the axial bore 116 of the candle body 115, and then actuates the cutting device 97 to sever the wicking strand 46 at the proper location with respect to the candle body.

As shown in FIG. 6, the candle body 115 may be provided with a dimple or concave recess 121 in the bottom surface 122 thereof, with the recess being concentric with the axial bore 116 of the candle body. By configuring the candle body in this fashion, a small amount of the wicking strand 46 may be allowed to protrude from the axial bore 116 of the body to form a tail 123. When the wicking strand 46 enters the axial bore 116 of the candle body 115, as described above, the operator can feel when this operation is completed by placing a finger in the recess 121, and when contact is made with the tail 123, the operator can bend the tail over which aids retention of the wicking within the candle body. The recess 121 allows the tail 123 to bend over without creating an uneven bottom surface for the candle to sit on.

From the foregoing description, it should be readily apparent that the apparatus 10 provides a complete mechanism for preparing, installing, and cutting candlewicking. However, it should be equally apparent that the various functions of the apparatus 10 could be accomplished separately if desired. For example, if the candlewicking received from the manufacturer was already prewaxed, then the prewaxing station 12 could be eliminated or otherwise rendered inoperative and the feed station 14 along with the installation and cutting station 16 would remain operative. Likewise, if candlewicking were to be prewaxed and cut into specific lengths, such as for use in forming candles by the dipping method, then the apparatus 10 could be operated without performing its installation function, in this instance, the trough 96 would serve to catch the severed lengths of candlewicking.

While the principles of the invention have now been made clear in an illustrated embodiment, there will be immediately obvious to to those skilled in the art, many modifications of structure, arrangements, proportions, the elements, materials, and components used in the practice of the invention, and otherwise, which are particularly adapted for specific environments and operation requirements without departing from those principles.

For example, partial automation of the apparatus 10 could easily be accomplished and such automation could take the form of a suitable actuation switch (not shown) in the trough 96 which would send a signal upon placement of a candle body in the trough. The signal could be employed to trigger a suitable solenoid operated device (not shown) for actuating the drive and measuring mechanism 70. The same signal could be directed through a delaying mechanism (not shown) and be employed to actuate the cutting device 97.

The appended claims are therefore intended to cover and embrace any such modifications within the limits only of the true spirit and scope of the invention.

What I claim is:

1. An apparatus for installing wicking in a candle body having an axial bore formed therein, said apparatus comprising:
   a. a preparation station having an elongated strand of wicking;
   b. a feed station for moving the strand of wicking from said preparation station to said feed station and passing the strand of wicking therethrough, said feed station including means for actuation thereof to move and a pass a measured amount of the strand of wicking upon actuation thereof; and
   c. an installation and cutting station for sequentially receiving and severing the measured amount of the strand of wicking supplied thereto by said feed station, said installation and cutting station having means upon which the candle body is demountably positionable so that the axial bore thereof is disposed to receive the measured amount of the strand of wicking prior to the severing thereof when the candle body is mounted therein.

2. An apparatus as claimed in claim 1 wherein said preparation station includes means for prewaxing the elongated strand of wicking.

3. An apparatus as claimed in claim 1 wherein said preparation station comprises:
   a. a base;
   b. a reel mounted for rotation on said base and having the strand of wicking wound thereon;
   c. a pot of molten wax mounted on said base;
   d. means between said reel and said pot for directing the strand of wicking from said reel into said pot;
   e. a cooling tower mounted adjacent said pot; and
   f. means within said pot and said cooling tower for directing the strand of wicking from said pot through said cooling tower.

4. An apparatus as claimed in claim 3 wherein said preparation station further comprises deburring means adjacent said cooling tower, said deburring means adapted to receive the strand of wicking from said cooling tower for smoothing the peripheral surface thereof.

5. An apparatus as claimed in claim 4 wherein said deburring means comprises:
   a. a housing having a forming die therein through which the strand of wicking is movable; and
   b. a heating element mounted within said housing in coaxial circumscribing relationship with respect to the forming die of said housing.

6. An apparatus as claimed in claim 1 wherein said feed station comprises:
   a. roller means for drivingly engaging the elongated strand of wicking from said preparation station; and
   b. a drive unit coupled to said roller means for driving said roller means a predetermined amount in one direction.

7. An apparatus as claimed in claim 1 wherein said feed station comprises:
   a. a plate;
   b. a drive roller rotatably journaled on said plate;
   c. a guide tube mounted on said plate through which the strand of wicking is movable, said guide tube positioned to direct the strand of wicking tangentially into engagement with the periphery of said drive roller;
   d. idler roller means mounted on said plate for biasingly engaging the strand of wicking at the point where the strand of wicking engages the periphery of said drive roller, whereby the strand of wicking is drivingly engaged therebetween; and
   e. a drive unit mounted on said plate and coupled to rotate said drive roller, said drive unit adapted to rotate said drive wheel a predetermined amount in one direction upon each actuation thereof.

8. An apparatus as claimed in claim 7 wherein said idler roller means comprises:
   a. a lever pivotably mounted on one end thereof to said plate and having a free end;
   b. an idler roller rotatably mounted on the free end of said lever; and
   c. biasing means between said plate and said lever for urging said idler roller toward said drive roller.

9. An apparatus as claimed in claim 7 wherein said feed station further comprises adjusting means on said plate and engagable with said drive unit to adjustably control the amount of rotational movement supplied thereby to said drive roller.

10. An apparatus as claimed in claim 1 wherein the means in said installation and cutting station upon which said candle body is demountably positionable includes an upwardly opening V-shaped trough.

11. An apparatus as claimed in claim 1 wherein said installation and cutting station comprises a cutting device for receiving the strand of wicking from said feed station and passing the measured amount thereof into the means upon which the candle body is demountably positionable and for severing that measured amount from the remainder of the strand of wicking.

12. An apparatus as claimed in claim 11 wherein said cutting device comprises:
   a. a housing having an aperture formed therethrough through which the strand of wicking is movable, said housing having a slot formed therein which transversely intersects the aperture thereof; and
   b. a lever pivotably mounted within the slot of said housing, said lever having a cutting edge thereon which moves in an arcuate tranversely intersecting path with respect to the aperture of said housing when said lever is pivotably moved within the slot of said housing.

13. An apparatus as claimed in claim 11 wherein said cutting device comprises:
   a. a housing having an aperture formed therethrough through which the strand of wicking is movable, said housing having a slot formed therein which transversely intersects the aperture thereof;
   b. a lever pivotably mounted within the slot of said housing for movement from a nonintersecting relationship with respect to the aperture of said housing to an intersecting relationship therewith;
   c. a cutting edge formed on said lever for movement therewith into the intersecting relationship with the aperture of said housing; and
   d. biasing means coupled to said lever for urging said lever toward the nonintersecting relationship with the aperture of said housing.

14. An apparatus as claimed in claim 1 wherein said installation and cutting station comprises:
   a. a trough which is upwardly opening so that the candle body is demountably positionable on one end thereof;
   b. a housing mounted on the other end of said trough, said housing having an aperture formed therethrough through which the strand of wicking is movable in a direction from said feed station toward the end of said trough upon which the candle body is demountably positionable, said housing having a surface from which the strand of wicking emerges after movement thereof through the aperture of said housing, the emerging surface being transverse to the aperture of said housing, said housing having a slot adjacent the emerging surface of said housing with the slot formed to transversely intersect the aperture of said housing; and
   c. a lever having a cutting edge thereon, said lever pivotably mounted within the slot of said housing for movement of the cutting edge thereof in an arcuate path which transversely intersects the aperture of said housing for severing the strand of wicking movable therein.

15. An apparatus as claimed in claim 14 wherein said installation and cutting station further comprises a butt plate mounted on the surface of said housing from which the strand of wicking emerges, said butt plate having a passage formed therethrough which is coaxial with the aperture of said housing, said butt plate adapted to engage the end of the candle body when the candle body is positioned therein and space that end from the aperture of said housing to prevent residual wax build up from interfering with movement of the strand of wicking through the aperture of said housing.

* * * * *